(12) United States Patent
Frank et al.

(10) Patent No.: US 7,520,560 B2
(45) Date of Patent: Apr. 21, 2009

(54) METHOD OF BONDING AND SEALING AUTOMOTIVE STRUCTURAL COMPONENT JOINTS

(75) Inventors: Steve Frank, Dearborn, MI (US); David Gary Dahlstrom, Grosse Pointe Farms, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 193 days.

(21) Appl. No.: 11/307,454

(22) Filed: Feb. 8, 2006

(65) Prior Publication Data

US 2007/0035157 A1 Feb. 15, 2007

Related U.S. Application Data

(60) Provisional application No. 60/708,108, filed on Aug. 12, 2005.

(51) Int. Cl.
*B60J 9/00* (2006.01)

(52) U.S. Cl. ............... 296/193.05; 296/203.03; 296/29

(58) Field of Classification Search ............ 296/187.01, 296/187.02, 187.03, 187.12, 193.05, 203.03, 296/29
See application file for complete search history.

(56) References Cited

U.S. PATENT DOCUMENTS

| | | | |
|---|---|---|---|
| 3,400,182 A | 9/1968 | Kolt | |
| 4,650,947 A | 3/1987 | Hutton et al. | |
| 5,636,895 A | 6/1997 | Ito et al. | |
| 6,368,008 B1* | 4/2002 | Biernat et al. | 29/458 |
| 6,619,727 B1 | 9/2003 | Barz | |
| 6,688,674 B2 | 2/2004 | Sato | |
| 6,729,425 B2 | 5/2004 | Schneider et al. | |
| 6,767,049 B1 | 7/2004 | Morrison et al. | |
| 6,846,559 B2* | 1/2005 | Czaplicki et al. | 428/355 EP |
| 6,880,657 B2 | 4/2005 | Schneider et al. | |
| 6,896,320 B2 | 5/2005 | Kropfeld | |
| 2003/0067187 A1 | 4/2003 | Curtiss et al. | |
| 2004/0046423 A1 | 3/2004 | Wieber | |
| 2004/0112531 A1 | 6/2004 | Bogert et al. | |
| 2004/0131839 A1* | 7/2004 | Eagle | 428/317.1 |
| 2004/0221953 A1 | 11/2004 | Czaplicki et al. | |
| 2004/0245676 A1 | 12/2004 | Zaluzec et al. | |

* cited by examiner

*Primary Examiner*—Lori L Lyjak
(74) *Attorney, Agent, or Firm*—Gregory P. Brown; Price, Heneveld, Cooper, DeWitt & Litton LLP

(57) ABSTRACT

A structural bonding and sealing system for motor vehicle structural joints may include a first structural joint member including a first bonding and sealing surface, and a second structural joint member including a second bonding and sealing surface. The system further includes the first bonding and sealing surface disposed generally adjacent the second bonding and sealing surface, and the first and second structural joint members generally forming the motor vehicle structural joint. An expandable structural adhesive may be disposed between the first and second structural joint members adjacent the respective first and second bonding and sealing surfaces. The expandable structural adhesive may be expandable to substantially fill an area between the first and second structural joint members, to substantially bond the first and second structural joint members, and to substantially seal the first and second structural joint members from water and air intrusion without use of a separate sealant material.

11 Claims, 8 Drawing Sheets

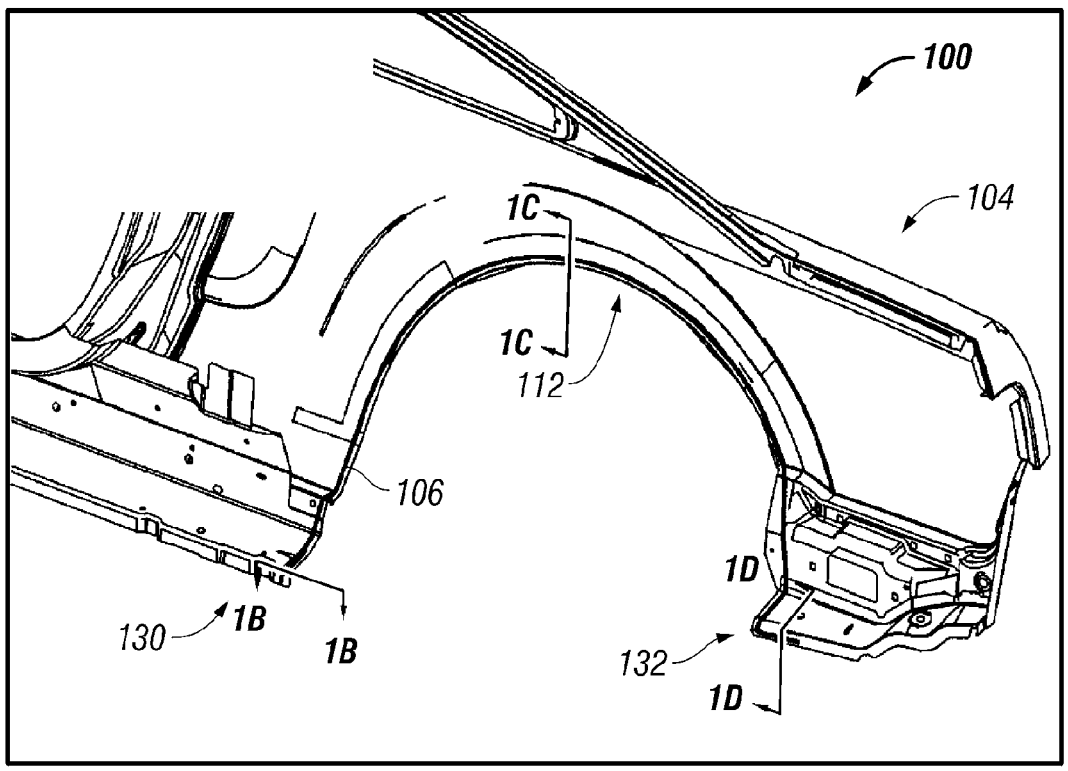
FIG. 1A
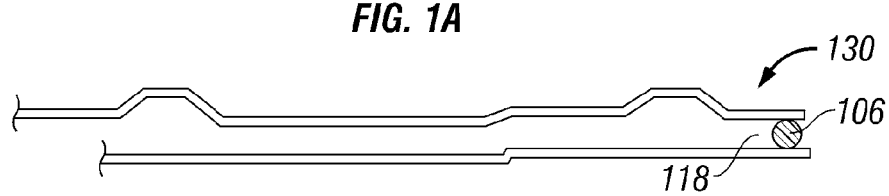
FIG. 1B
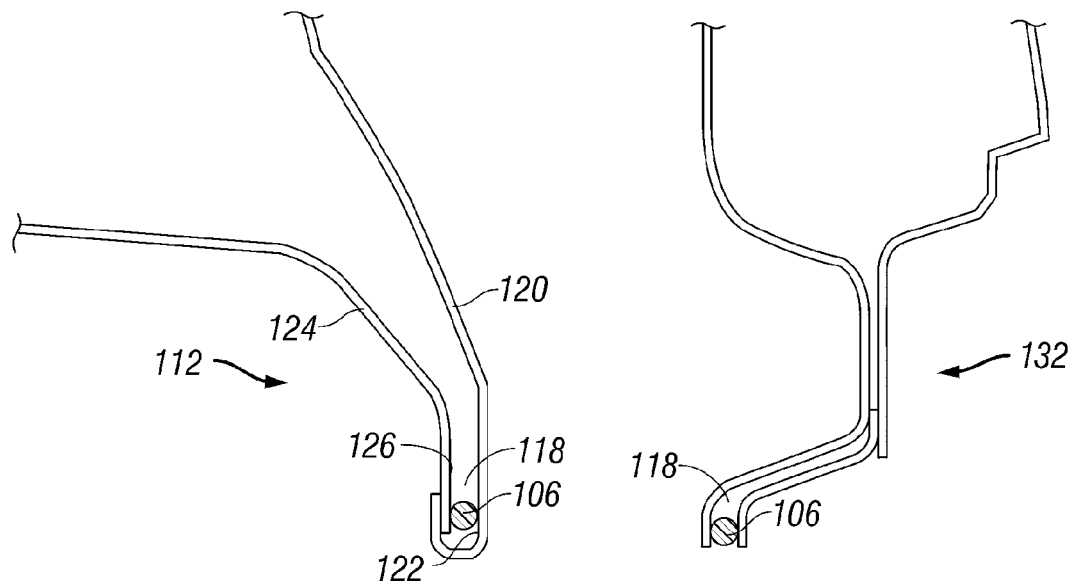
FIG. 1C  FIG. 1D

METHOD OF BONDING AND SEALING AUTOMOTIVE STRUCTURAL COMPONENT JOINTS

RELATED APPLICATIONS

This application claims the benefit of priority of U.S. Provisional Application No. 60/708,108, filed Aug. 12, 2005, hereby incorporated by reference in its entirety.

BACKGROUND OF INVENTION a. Field of Invention

The invention relates generally to vehicle structural component assembly, and, more particularly, to a method of bonding and sealing vehicle structural component joints.

b. Description of Related Art

As is known in the art, one method of joining automotive structural or bodyside components is to bond the components by an adhesive having a predetermined bending and torsional stiffness. While known adhesives used for such bonding provide adequate bending and torsional stiffness properties, such adhesives lack the sealing properties for air leakage or water intrusion. Therefore, a secondary sealing step is required for meeting air leakage and water intrusion requirements.

For example, while in a coupe automobile, bending stiffness requirements may be on the order of 75,000 lbf/in and torsional stiffness requirements may be on the order of 13,500 ft-lbf/deg, in convertible automobiles, the bending stiffness requirements may be on the order of 32,000 lbf/in and torsional stiffness requirements may be on the order of 6,000 ft-lbf/deg. While the noted bending and torsional stiffness requirements in such coupe and convertible automobiles may be different, in order to meet production costs and volumetric requirements, since the noted types of automobiles often share a variety of structural and bodyside components, the adhesives and sealers used are also generally common to both types of automobiles. Thus it is often difficult to change the type of adhesives and sealers used in different types of automobiles, without significantly increasing the design and production costs, running the risk of failing to meet the noted bending and torsional stiffness or sealing requirements, and/or requiring use of secondary structural reinforcement for meeting such requirements.

Yet further, from a production viewpoint, the steps of bonding and sealing structural and bodyside component joints generally require the first step of adhesive application. Thereafter, upon application of sufficient pressure for adhesive bonding and/or elapse of sufficient time for adhesive curing, a sealer which expands approximately 150% of its original application layer thickness may be applied to cover the adhesive bond area. Thus when used in combination, the noted adhesive and sealer layers provide adequate bending and torsional stiffness, and sealing properties. Nevertheless, as readily evident, use of the separate adhesive and sealer layers in a fast-paced automotive assembly environment are prohibitive both from a cost and production time requirement perspective.

Such an exemplary bonding and sealing method is disclosed for example in U.S. Patent App. No. 2004/0046423 to Wieber. Referring to FIGS. 1 of Wieber, there is disclosed a roof (12) including roof panel (16), and body panel (14), which may be a door side panel, which are interconnected via flanges (58, 26). A structural adhesive material (74) extends along the side edges (22, 54) respectively of the outer roof panel (16) and the outer body panel (14). Further, a strip (76) of sealant material is likewise provided and extends the side edges (22, 54) respectively of the outer roof panel (16) and the outer body panel (14).

Thus, as discussed above, Wieber discloses a bonding and sealing method which requires application of a first structural adhesive material and a second sealing layer for meeting the structural strength and sealing requirements in an automobile. Wieber also discloses the use of the adhesive/sealant combination in a roof/door panel area, which is also known in the art. Yet further, whereas Wieber discloses the adhesive material may be flowable and/or expandable upon the application of heat, Wieber nevertheless requires the use of both adhesive and sealant layers for meeting structural strength and sealing requirements.

It would therefore be of benefit to provide a method of bonding and sealing automotive structural and bodyside components without significantly increasing the costs associated with such processes, and without significantly affecting the performance characteristics of the joints, regardless of the types of automobiles. It would also be of benefit to provide a method of bonding and sealing automotive structural and bodyside components in a single-step process, without the need for separately bonding and sealing component joints.

SUMMARY OF INVENTION

The invention solves the problems and overcomes the drawbacks and deficiencies of prior art structural component bonding and sealing techniques by providing a structural bonding and sealing system for a motor vehicle structural joint. The system may include a first structural joint member including a first bonding and sealing surface, and a second structural joint member including a second bonding and sealing surface. The first bonding and sealing surface may be disposed generally adjacent the second bonding and sealing surface. The first and second structural joint members may generally form the motor vehicle structural joint. An expandable structural adhesive may be disposed between the first and second structural joint members adjacent the respective first and second bonding and sealing surfaces. The expandable structural adhesive may be expandable to at least 100% of an original layer thickness to substantially fill an area between the first and second structural joint members, to substantially bond the first and second structural joint members to each other, and to substantially seal the first and second structural joint members from water and air intrusion without use of a separate sealant material.

For the structural bonding and sealing system described above, the first and second structural joint members may be a Hem Flange, an AB Flange or a weld flange. The expandable structural adhesive may bond the first and second structural joint members to provide a bending stiffness of greater than approximately 75,000 lbf/in and a torsional stiffness of greater than approximately 13,500 ft-lbf/deg for a coupe automobile, and a bending stiffness of greater than approximately 32,000 lbf/in and a torsional stiffness of greater than approximately 6,000 ft-lbf/deg for a convertible automobile. The expandable structural adhesive may seal the first and second structural joint members to allow air leakage between the first and second structural joint members at less than approximately 200 cmf for coupe and convertible automobiles. Yet further, the expandable structural adhesive may seal the first and second structural joint members to provide no water passage between the first and second structural joint members.

The invention also provides a structural bonding and sealing system for a motor vehicle structural joint. The system may include a first structural joint member including a first bonding and sealing surface, and a second structural joint member including a second bonding and sealing surface. The first bonding and sealing surface may be disposed generally adjacent the second bonding and sealing surface. The first and second structural joint members may generally form the motor vehicle structural joint. An expandable structural adhesive may be disposed between the first and second structural joint members adjacent the respective first and second bonding and sealing surfaces. The expandable structural adhesive may be expandable to substantially fill an area between the first and second structural joint members, to substantially bond the first and second structural joint members to each other, and to substantially seal the first and second structural joint members from water and air intrusion without use of a separate sealant material.

Yet further, the invention provides a vehicle including a structural bonding and sealing system for a motor vehicle structural joint. The system may include a first structural joint member including a first bonding and sealing surface, and a second structural joint member including a second bonding and sealing surface. The first bonding and sealing surface may be disposed generally adjacent the second bonding and sealing surface. The first and second structural joint members may generally form the motor vehicle structural joint. An expandable structural adhesive may be disposed between the first and second structural joint members adjacent the respective first and second bonding and sealing surfaces. The expandable structural adhesive may be expandable to substantially fill an area between the first and second structural joint members, to substantially bond the first and second structural joint members to each other, and to substantially seal the first and second structural joint members from water and air intrusion without use of a separate sealant material.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIG. 1A is a sectional view of a coupe automobile quarter panel illustrating expandable structural adhesive applied to a Hem Flange and adjacent areas according to the present invention structural bonding and sealing method;

FIGS. 1B-1D are cross-sectional views taken substantially along lines 1B-1B, 1C-1C and 1D-1D, respectively, in FIG. 1A, illustrating exemplary joints adjacent the quarter panel;

DETAILED DESCRIPTION OF THE PREFERRED EMBODIMENTS

Figure 2A:
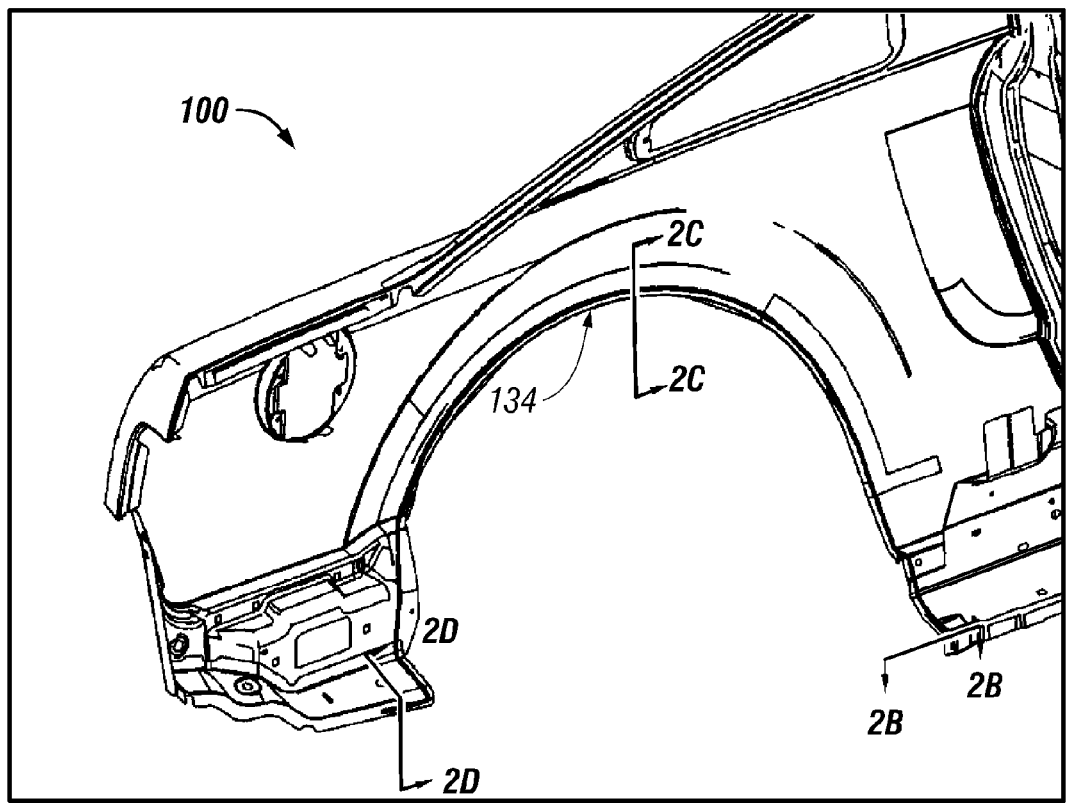
FIG. 2A is another sectional view of a coupe automobile quarter panel illustrating expandable structural adhesive applied to a Hem Flange and adjacent areas according to the present invention structural bonding and sealing method.
Figure 2B:
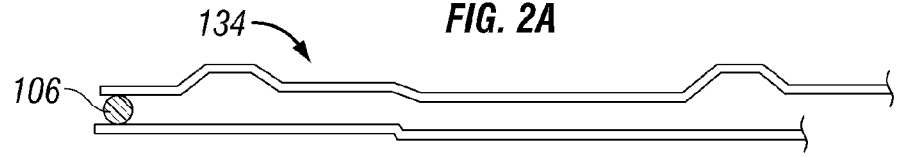
FIGS. 2B-2D are cross-sectional views taken substantially along lines 2B-2B, 2C-2C and 2D-2D, respectively, in FIG. 2A, illustrating exemplary joints adjacent the quarter panel.
Figure 2C:
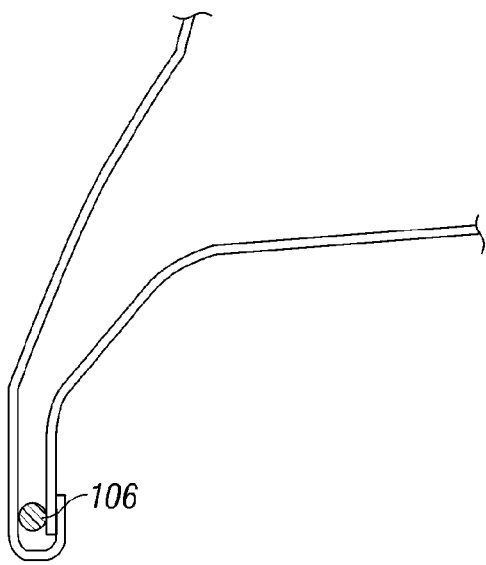
Figure 2D:
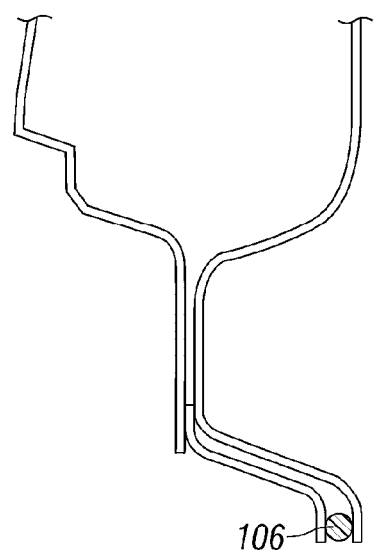

Referring now to the drawings wherein like reference numerals designate corresponding parts throughout the several views, FIGS. 1A-8 illustrate various exemplary views of coupe and convertible automobiles illustrating expandable structural adhesive applied thereon according to the present invention structural bonding and sealing method.

Figure 3A:
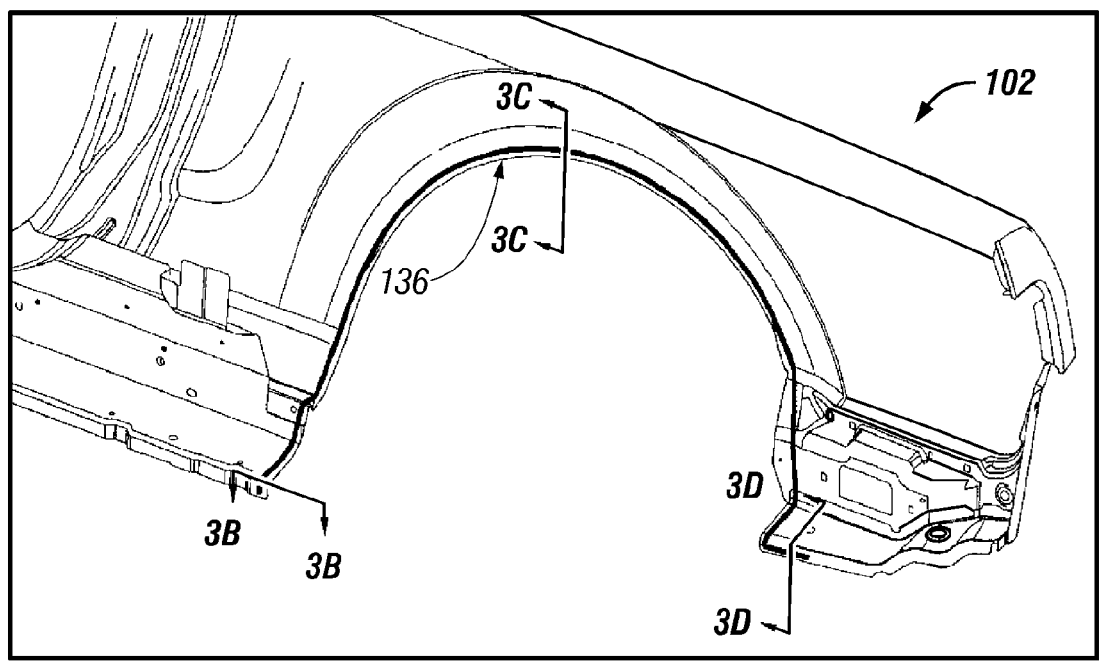
FIG. 3A is a sectional view of a convertible automobile quarter panel illustrating expandable structural adhesive applied to a Hem Flange and adjacent areas according to the present invention structural bonding and sealing method.
Figure 3B:
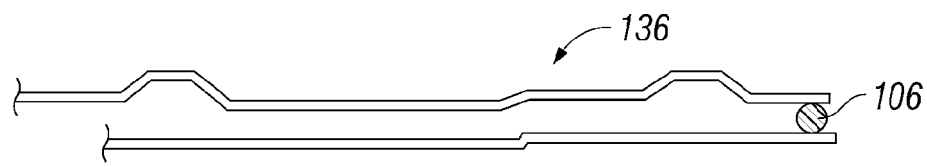
FIGS. 3B-3D are cross-sectional views taken substantially along lines 3B-3B, 3C-3C and 3D-3D, respectively, in FIG. 3A, illustrating exemplary joints adjacent the quarter panel.
Figure 3C:
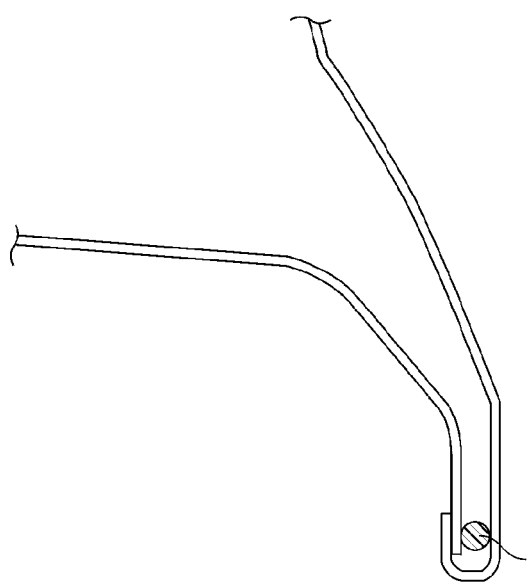
Figure 3D:
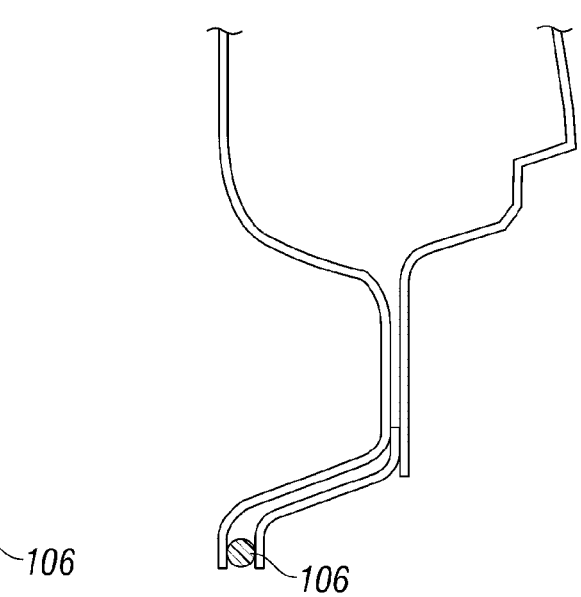

As discussed above, while in a coupe automobile, such as automobile 100 illustrated in FIG. 1A, bending stiffness requirements may be on the order of 75,000 lbf/in and torsional stiffness requirements may be on the order of 13,500 ft-lbf/deg, in convertible automobiles, such as automobile 102 of FIG. 3A, the bending stiffness requirements may be on the order of 32,000 lbf/in and torsional stiffness requirements may be on the order of 6,000 ft-lbf/deg. In order to meet production costs and volumetric requirements, the present invention employs the use of expandable structural adhesive for bonding and sealing key structural joints, as well as for meeting noise and related performance requirements in the noted coupe and convertible automobiles 100, 102, without requiring structural changes at the adhesive application joints.

Specifically, referring to FIG. 1A, a sectional view of a coupe automobile quarter panel 104 illustrating expandable structural adhesive 106 applied thereon according to the present invention structural bonding and sealing method is illustrated. As shown in FIG. 1A, the present invention bonding and sealing method employs the use of expandable structural adhesive 106 in the joint for Hem Flange 112, and adjacent joints 130, 132, respectively illustrated in FIGS. 1C, 1B and 1D. In the particular configuration illustrated, the expandable structural adhesive may be WSS-M2G411-A adhesive. For Hem flange 112, the use of expandable structural adhesive prevents leaks in the transition from the Hem Flange to joints 130, 132.

As shown, by adding expandable structural adhesive 106 to Hem Flange 112 and the noted joints 130 and 132, the expansion properties of the adhesive enable adequate sealing of any gaps 118 in the noted joints. In the particular example illustrated, the expansion properties of adhesive 106 may allow it to expand at least 100%.

In a particular example of the present invention, referring to FIG. 1C, use of expandable structural adhesive 106 is illustrated for Hem Flange 112. In this case, Hem Flange 112 may include a first structural joint member 120 including a first bonding and sealing surface 122, and a second structural joint member 124 including a second bonding and sealing surface 126. As illustrated in FIG. 1C, the first bonding and sealing surface 122 may be disposed generally adjacent the second bonding and sealing surface 126, and the first and second structural joint members 120, 124 generally form the joint for Hem Flange 112. Expandable structural adhesive 106 may be disposed between the first and second structural joint members 120, 124 adjacent the respective first and second bonding and sealing surfaces 122, 126. In this manner, adhesive 106 may expand to substantially fill the area between the first and second structural joint members 120, 124, to substantially bond the first and second structural joint members, and to substantially seal the first and second structural joint members from water and air intrusion without use of a separate sealant material. The structural joint members for joints 130, 132 may be bonded and sealed in a similar manner as the joint for Hem Flange 112.

Referring to FIGS. 1B-1D, in order to seal Hem Flange 112 and the noted joints 130 and 132 during the manufacture of automobiles 100, 102, a single robot (not shown) may be used for applying expandable structural adhesive 106 to the noted joints. Thus use of adhesive 106 is beneficial in that it eliminates the need for multiple robots for applying a structural adhesive, a separate sealing agent, as well as alternative bonding and sealing methods which may employ the use of die cut adhesives (which are manually applied to the body structure) or additional metal to the noted joint areas for meeting the aforementioned stiffness, torsion and sealing requirements.

Referring to FIG. 1A, in the exemplary coupe automobile 100 illustrated, exemplary air leakage specifications may be set at 200 CFM and water intrusion may be set for no water intrusion into the interior compartment for a 20 minute soak test. For typical automobiles, water leak paths generally include paths adjacent structural joints such as the AB Flange and weld flanges. Use of expandable structural adhesive is therefore targeted to prevent water intrusion at the applied joints, without the use of a separate sealant.

Referring to Table 1, which provides test results for expandable structural adhesive 106 applied to Hem Flange 112 and the noted joints 130 and 132, adhesive 106 provides air sealing on the order of approximately 154 CFM, much lower than the 200 CFM requirement set forth above. Yet further, adhesive 106 provides for no water intrusion into the interior compartment for a 20 minute soak test. Although not illustrated, additional testing may include a 5 minute soak test, with an objective of the 5 and 20 minute soak tests being identifying root cause of water leakage into passenger and luggage compartments. These tests may simulate a vehicle parked in a heavy rain with the air conditioning and windshield wipers off.

TABLE 1

|  | Torsion Stiffness Target (T) Actual (A) | Static Stiffness Target (T) Actual (A) | Air Leakage Target (T) Actual (A) | Water Leakage Target (T) Actual (A) |
|---|---|---|---|---|
| Coupe | T - 13,500 ft-lbf/deg A - 21,207 ft-lbf/deg | T - 75,000 lbf/in A - 87,589 lbf/in | Air Leakage T - 200 cfm A - 150 cfm | Water Leakage T - 0 A - 0 |
| Convertible | T - 6,000 ft-lbf/deg A - 16,668 ft-lbf/deg | T - 32,000 lbf/in A - 35,606 lbf/in | Air Leakage T - 200 cfm A - 182 cfm | Water Leakage T - 0 A - 0 |

As also shown in Table-1 above, use of expandable structural adhesive 106 clearly exceeds the aforementioned bending and torsional stiffness requirements. For example, for a coupe automobile, such as automobile 100 illustrated in FIG. 1A, bending stiffness requirements may be on the order of 75,000 lbf/in and torsional stiffness requirements may be on the order of 13,500 ft-lbf/deg. In a test performed on a coupe automobile using expandable structural adhesive 106 in the aforementioned areas of the Hem and AB flanges, bending stiffness was tested at 87,589 lbf/in and torsional stiffness was tested at 21,207 ft-lbf/deg, each well above the noted bending and torsional stiffness requirements. Further, in convertible automobiles, such as automobile 102 of FIG. 3A, the bending stiffness requirements may be on the order of 32,000 lbf/in and torsional stiffness requirements may be on the order of 6,000 ft-lbf/deg. In a test performed on a convertible automobile using expandable structural adhesive 106 in the aforementioned areas of the Hem and AB flanges, bending stiffness was tested at 35,606 lbf/in and torsional stiffness was tested at 16,668 ft-lbf/deg, each also well above the noted bending and torsional stiffness requirements.

The use of expandable structural adhesive thus eliminates the need for 100% testing of the Hem Flange (or AB Flange), which as readily evident, adds significant cost and complexity to the manufacturing process of such component areas. The use of expandable structural adhesive also reduces the weight of a convertible (as well as coupe) automobile (such as automobile 102 of FIGS. 3A and 4A) by at least 10 lbs. As readily evident, this reduction provides for significant benefits such as the elimination of conventional structural stiffness techniques employed.

Figure 4A:
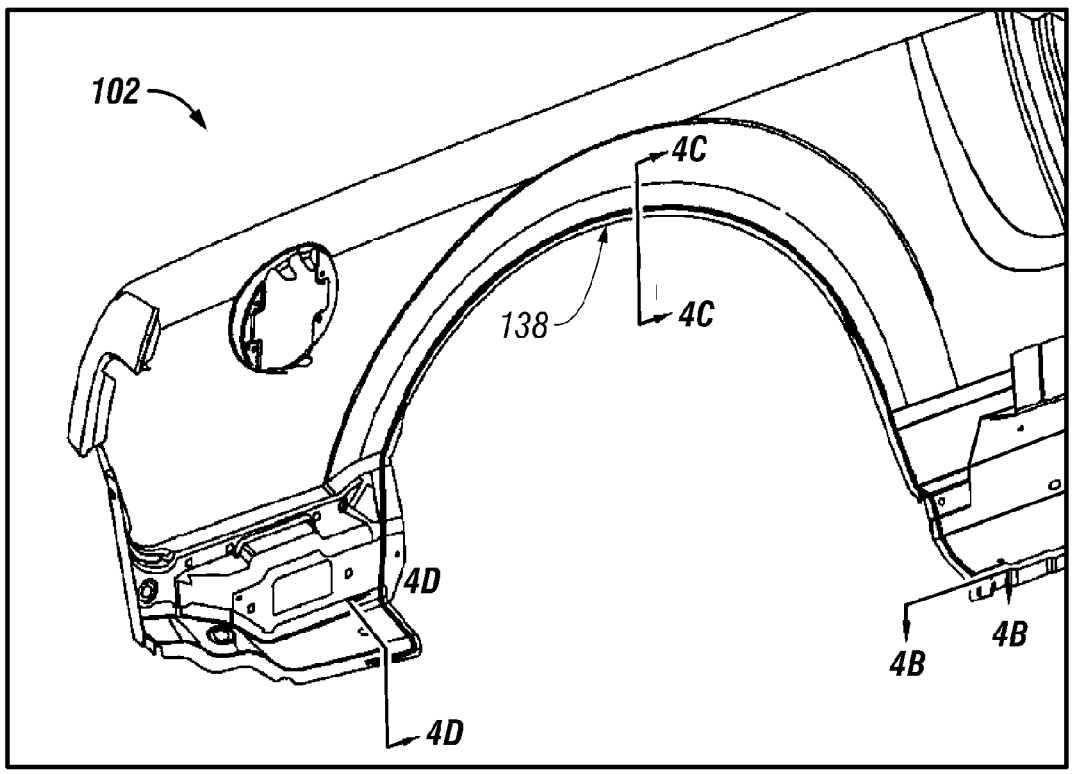
FIG. 4A is another sectional view of a convertible automobile quarter panel illustrating expandable structural adhesive applied to a Hem Flange and adjacent areas according to the present invention structural bonding and sealing method.
Figure 4B:
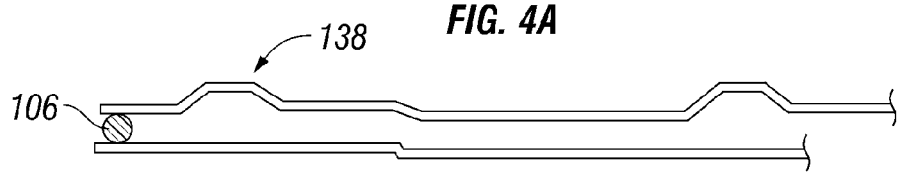
FIGS. 4B-4D are cross-sectional views taken substantially along lines 4B-4B, 4C-4C and 4D-4D, respectively, in FIG. 4A, illustrating exemplary joints adjacent the quarter panel.
Figure 4C:
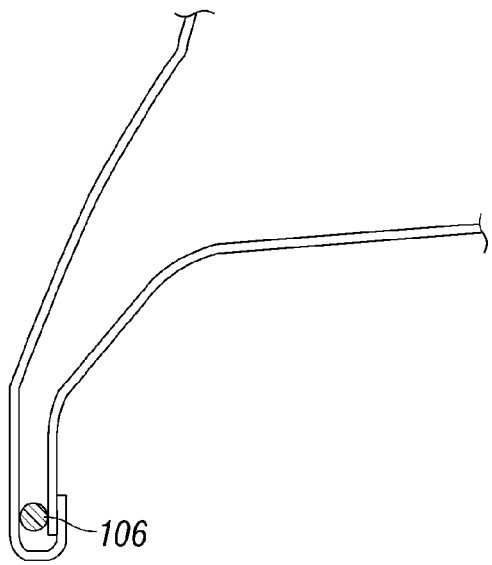
Figure 4D:
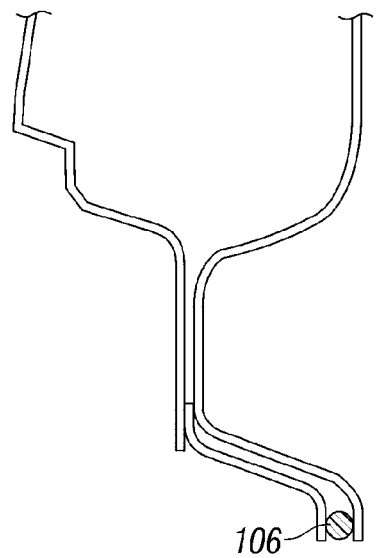

Referring to FIGS. 2A, 3A and 4A, expandable structural adhesive 106 is illustrated as being used for Hem Flanges 134, 136 and 138, respectively, of coupe automobiles (100 of FIG. 2A) and convertible automobiles (102 of FIGS. 3A and 4A). For automobiles 100, 102 of FIGS. 1A, 2A, 3A and 4A, the joints adjacent Hem Flanges 134, 136 and 138, may employ expandable structural adhesive 106 in a similar manner as joints 130, 132 of FIG. 1A.

Figure 6A:
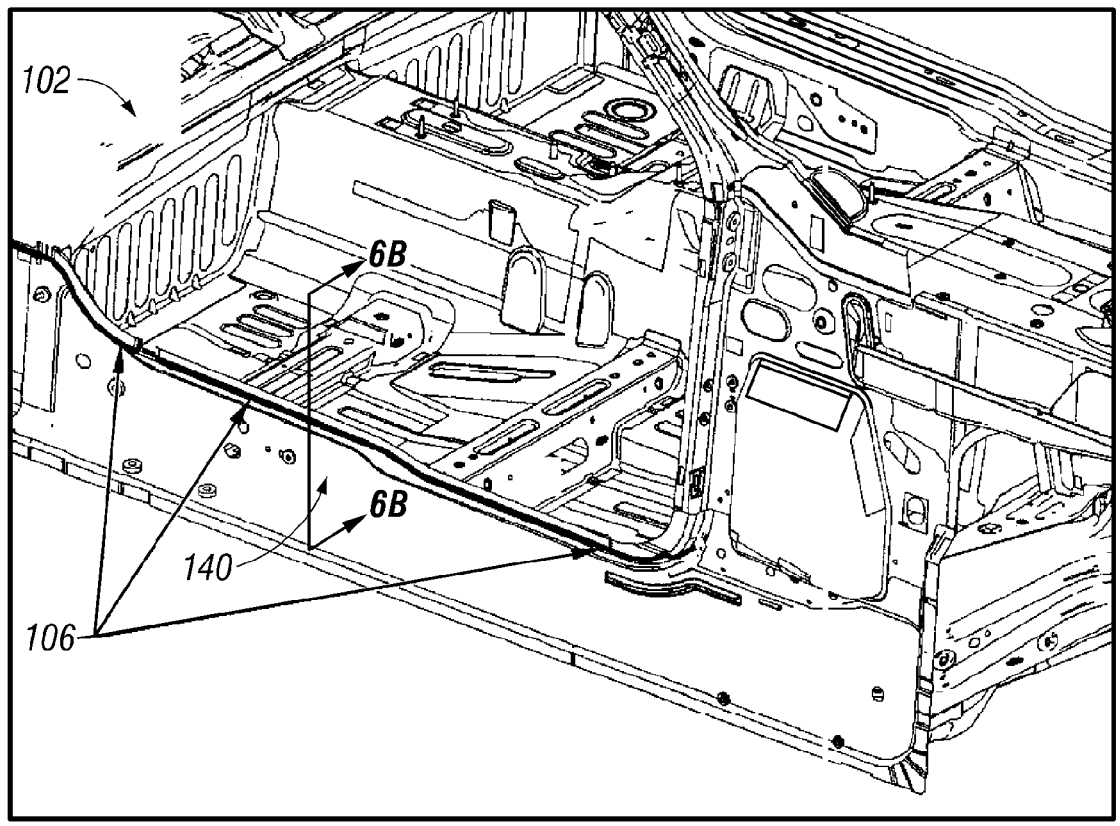
FIG. 6A is another sectional view of a convertible automobile underbody illustrating expandable structural adhesive applied to an AB Flange according to the present invention structural bonding and sealing method.
Figure 6B:
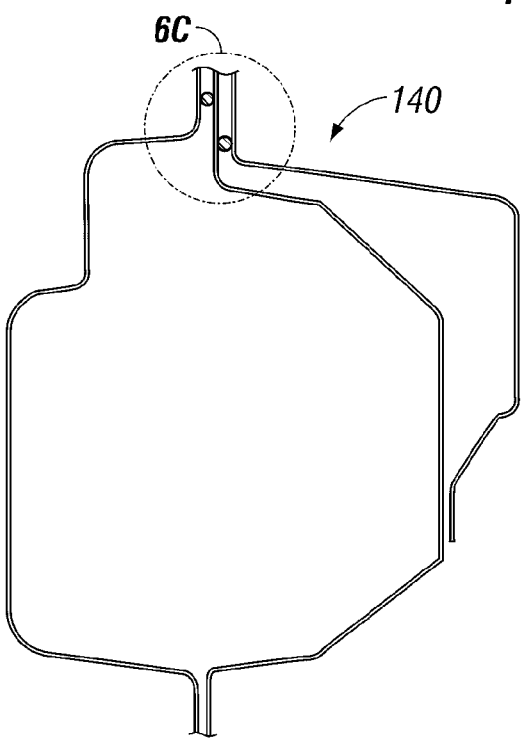
FIGS. 6B is a cross-sectional view taken substantially along lines 6B-6B in FIG. 6A, illustrating the AB Flange joint adjacent the underbody.
Figure 6C:
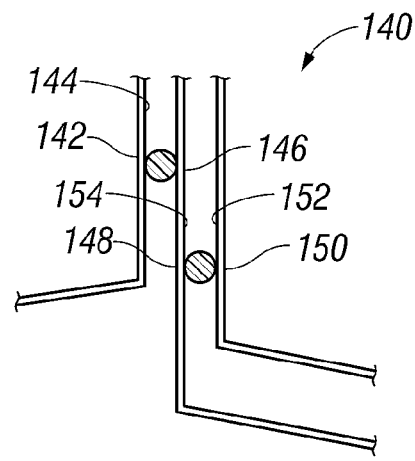
FIG. 6C is an enlarged view of FIG. 6B.

Referring next to FIG. 6A, use of expandable structural adhesive 106 is illustrated for AB Flange 140. Referring to FIGS. 6B and 6C, in this case, AB Flange 140 may include a first structural joint member 142 including a first bonding and sealing surface 144, a second structural joint member 146 including a second bonding and sealing surface 148, a third structural joint member 150 including a third bonding and sealing surface 152, and a fourth bonding and sealing surface 154 on the opposite side of joint member 146. As illustrated in FIGS. 6B and 6C, the first bonding and sealing surface 144 may be disposed generally adjacent the second bonding and sealing surface 148, and the first and second structural joint members 142, 146 generally form a joint for AB Flange 140.

Expandable structural adhesive 106 may be disposed between the first and second structural joint members 142, 146 adjacent the respective first and second bonding and sealing surfaces 144, 148. Likewise, the third bonding and sealing surface 152 may be disposed generally adjacent the fourth bonding and sealing surface 154, and the third and second structural joint members 150, 146 generally form another joint for AB Flange 140. Expandable structural adhesive 106 may be disposed between the third and second structural joint members 150, 146 adjacent the respective third and fourth bonding and sealing surfaces 152, 154. In this manner, adhesive 106 may be expand to substantially fill the area between the first and second structural joint members 142, 146, to substantially bond the first and second structural joint members, and to substantially seal the first and second structural joint members from water and air intrusion without use of a separate sealant material. As readily evident, adhesive 106 may likewise be expand to substantially fill the area between the third and second structural joint members 150, 146, for bonding and sealing these joint members in a similar manner as members 142, 146.

Figure 5:
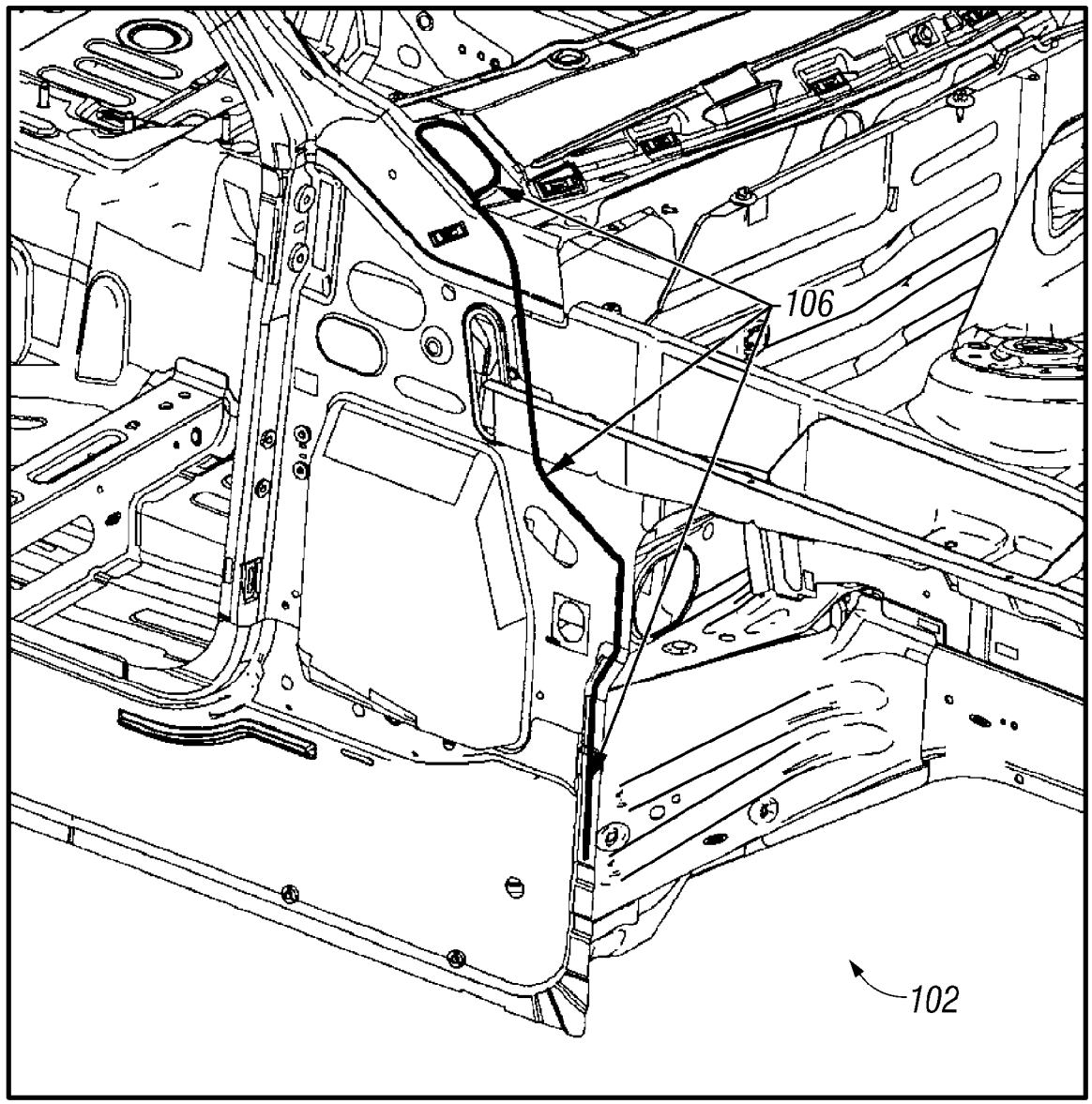
FIG. 5 is a sectional view of a convertible automobile underbody illustrating expandable structural adhesive applied to an area adjacent an AB Flange according to the present invention structural bonding and sealing method.
Figure 7:
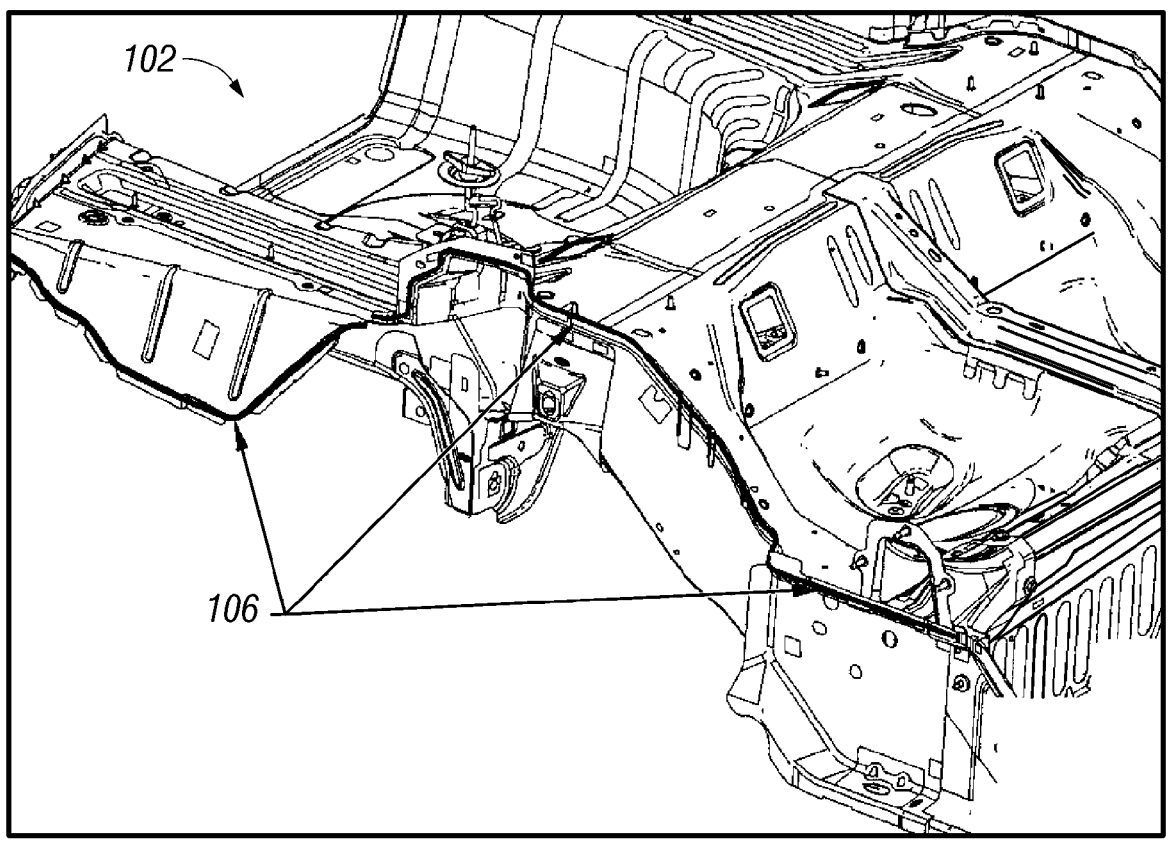
FIG. 7 is yet another sectional view of a convertible automobile underbody illustrating expandable structural adhesive applied to an area adjacent an AB Flange according to the present invention structural bonding and sealing method.
Figure 8:
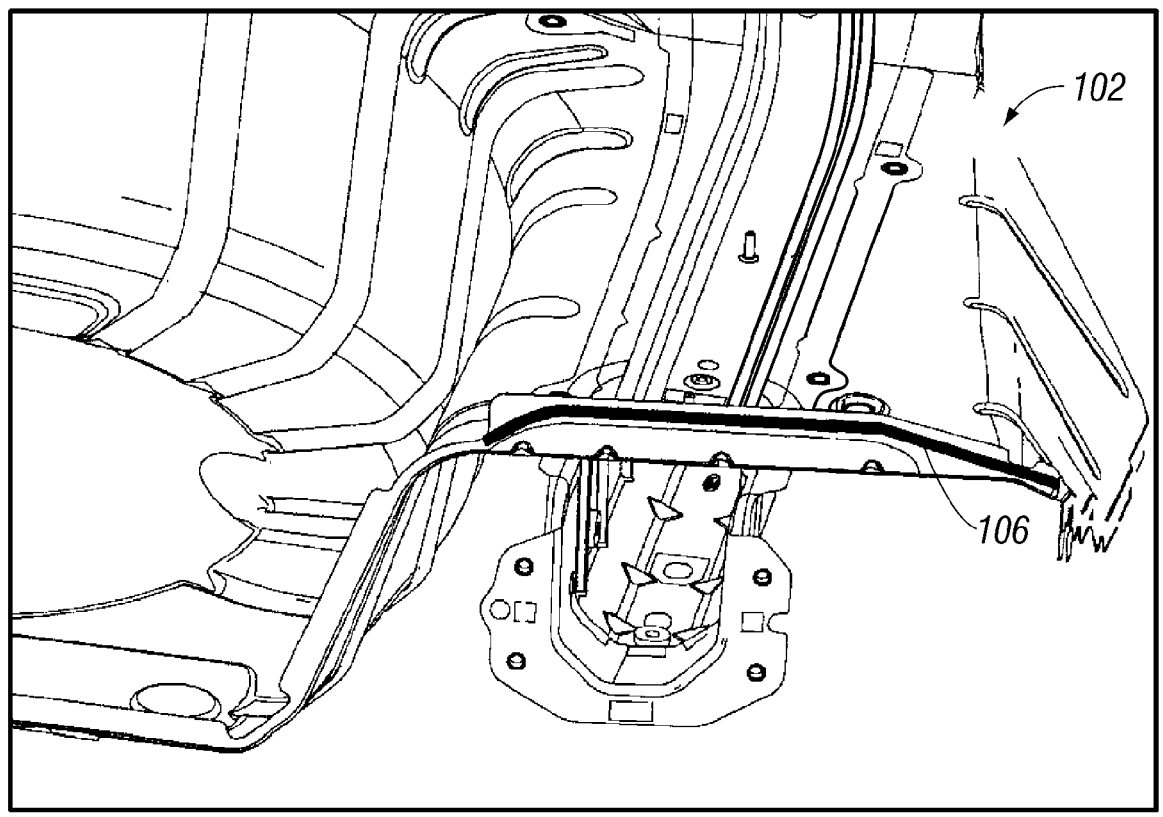
FIG. 8 is another sectional view of a convertible automobile underbody illustrating expandable structural adhesive applied to an area adjacent an AB Flange according to the present invention structural bonding and sealing method.

Referring to FIGS. 5, 7 and 8, expandable structural adhesive 106 may be applied in a continuous manner to the joints or areas adjacent AB Flange 140 for bonding and sealing the areas illustrated in FIGS. 5, 7 and 8 as needed.

While conventional techniques of meeting the noted bending and torsional stiffness requirements, as well as the noted air leakage and water intrusion requirements, include the use of structural adhesive with a secondary expandable sealer, based on the method discussed above, the present invention achieves the aforementioned requirements while reducing design and manufacturing complexity, as well as reducing the overall weight and cost for meeting such requirements. To date, no known automobiles include the application of only expandable structural adhesive to key areas such as the AB or Hem Flanges for meeting the aforementioned structural bending and torsional requirements, as well as the noted air leakage and water intrusion requirements.

The present invention is also beneficial in that it requires no additional tooling and utilizes a typical robot for applying adhesive in conventional adhesive and sealing application systems for simultaneously sealing and bonding key structural joints such as the AB and Hem Flanges for meeting and exceeding the aforementioned water, air and stiffness requirements. The use of expandable structural adhesive also provides for significant cost reduction in vehicles by eliminating the separate adhesive and sealing application requirements, reducing the overall automobile weight, especially in convertible automobiles, and actually exceeding structural bending and stiffness requirements. The use of expandable structural adhesive also allows for communization of the bonding and sealing processes for coupe and convertible structures.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A structural bonding and sealing system for a motor vehicle structural joint, said system comprising:
a first structural joint member including a first bonding and sealing surface;
a second structural joint member including a second bonding and sealing surface;
said first bonding and sealing surface being disposed generally adjacent said second bonding and sealing surface;
said first and second structural joint members generally forming said motor vehicle structural joint; and
an expandable structural adhesive being disposed between said first and second structural joint members adjacent said respective first and second bonding and sealing surfaces,
wherein said expandable structural adhesive being expandable to at least 100% of an original layer thickness to substantially fill an area between said first and second structural joint members, to substantially bond said first and second structural joint members to each other, and to substantially seal said first and second structural joint members from water and air intrusion without use of a separate sealant material, and said first and second structural joint members being one of an AB Flange and a weld flange.

2. A structural bonding and sealing system for a motor vehicle structural joint, said system comprising:
a first structural joint member including a first bonding and sealing surface;
a second structural joint member including a second bonding and sealing surface;
said first bonding and sealing surface being disposed generally adjacent said second bonding and sealing surface;
said first and second structural joint members generally forming said motor vehicle structural joint; and
an expandable structural adhesive being disposed between said first and second structural joint members adjacent said respective first and second bonding and sealing surfaces,
wherein said expandable structural adhesive being expandable to at least 100% of an original layer thickness to substantially fill an area between said first and second structural joint members, to substantially bond said first and second structural joint members to each other, and to substantially seal said first and second structural joint members from water and air intrusion without use of a separate sealant material, and wherein said expandable structural adhesive bonds said first and second structural joint members to provide a bending stiffness of greater than approximately 75,000 lbf/in and a torsional stiffness of greater than approximately 13,500 ft-lbf/deg for a coupe automobile, and a bending stiffness of greater than approximately 32,000 lbf/in and a torsional stiffness of greater than approximately 6,000 ft-lbf/deg for a convertible automobile.

3. A structural bonding and sealing system for a motor vehicle structural joint, said system comprising:
a first structural joint member including a first bonding and sealing surface;
second structural joint member including a second bonding and sealing surface;
said first bonding and sealing surface being disposed generally adjacent said second bonding and sealing surface;
said first and second structural joint members generally forming said motor vehicle structural joint; and
an expandable structural adhesive being disposed between said first and second structural joint members adjacent said respective first and second bonding and sealing surfaces,
wherein said expandable structural adhesive being expandable to at least 100% of an original layer thickness to substantially fill an area between said first and second structural joint members, to substantially bond said first and second structural joint members to each other, and to substantially seal said first and second structural joint members from water and air intrusion without use of a separate sealant material, and wherein said expandable structural adhesive seals said first and second structural joint members to allow air leakage between said first and second structural joint members at less than approximately 200 cmf for coupe and convertible automobiles.

4. A structural bonding and sealing system according to claim 1, wherein said expandable structural adhesive seals said first and second structural joint members to provide no water passage between said first and second structural joint members.

5. A structural bonding and sealing system for a motor vehicle structural joint, said system comprising:
- a first structural joint member including a first bonding and sealing surface;
- a second structural joint member including a second bonding and sealing surface;
- said first bonding and sealing surface being disposed generally adjacent said second bonding and sealing surface;
- said first and second structural joint members generally forming said motor vehicle structural joint; and
- an expandable structural adhesive being disposed between said first and second structural joint members adjacent said respective first and second bonding and sealing surfaces,
- wherein said expandable structural adhesive being expandable to substantially fill an area between said first and second structural joint members, to substantially bond said first and second structural joint members to each other, and to substantially seal said first and second structural joint members from water and air intrusion without use of a separate sealant material, and said first and second structural joint members being one of an AB Flange and a weld flange.

6. A structural bonding and sealing system for a motor vehicle structural joint, said system comprising:
- a first structural joint member including a first bonding and sealing surface;
- a second structural joint member including a second bonding and sealing surface;
- said first bonding and sealing surface being disposed generally adjacent said second bonding and sealing surface;
- said first and second structural joint members generally forming said motor vehicle structural joint; and
- an expandable structural adhesive being disposed between said first and second structural joint members adjacent said respective first and second bonding and sealing surfaces,
- wherein said expandable structural adhesive being expandable to substantially fill an area between said first and second structural joint members, to substantially bond said first and second structural joint members to each other, and to substantially seal said first and second structural joint members from water and air intrusion without use of a separate sealant material, and wherein said expandable structural adhesive bonds said first and second structural joint members to provide a bending stiffness of greater than approximately 75,000 lbf/in and a torsional stiffness of greater than approximately 13,500 ft-lbf/deg for a coupe automobile, and a bending stiffness of greater than approximately 32,000 lbf/in and a torsional stiffness of greater than approximately 6,000 ft-lbf/deg for a convertible automobile.

7. A structural bonding and sealing system for a motor vehicle structural joint, said system comprising:
- a first structural joint member including a first bonding and sealing surface;
- a second structural joint member including a second bonding and sealing surface;
- said first bonding and sealing surface being disposed generally adjacent said second bonding and sealing surface;
- said first and second structural joint members generally forming said motor vehicle structural joint; and
- an expandable structural adhesive being disposed between said first and second structural joint members adjacent said respective first and second bonding and sealing surfaces,
- wherein said expandable structural adhesive being expandable to substantially fill an area between said first and second structural joint members, to substantially bond said first and second structural joint members to each other, and to substantially seal said first and second structural joint members from water and air intrusion without use of a separate sealant material, and wherein said expandable structural adhesive seals said first and second structural joint members to allow air leakage between said first and second structural joint members at less than approximately 200 cmf for coupe and convertible automobiles.

8. A structural bonding and sealing system according to claim 5, wherein said expandable structural adhesive seals said first and second structural joint members to provide no water passage between said first and second structural joint members.

9. A vehicle comprising a structural bonding and sealing system for a motor vehicle structural joint, said system comprising:
- a first structural joint member including a first bonding and sealing surface;
- a second structural joint member including a second bonding and sealing surface;
- said first bonding and sealing surface being disposed generally adjacent said second bonding and sealing surface;
- said first and second structural joint members generally forming said motor vehicle structural joint; and
- an expandable structural adhesive being disposed between said first and second structural joint members adjacent said respective first and second bonding and sealing surfaces,
- wherein said expandable structural adhesive being expandable to substantially fill an area between said first and second structural joint members, to substantially bond said first and second structural joint members to each other, and to substantially seal said first and second structural joint members from water and air intrusion without use of a separate sealant material, and said first and second structural joint members being one of an AB Flange and a weld flange.

10. A vehicle comprising a structural bonding and sealing system for a motor vehicle structural joint, said system comprising:
- a first structural joint member including a first bonding and sealing surface;
- a second structural joint member including a second bonding and sealing surface;
- said first bonding and sealing surface being disposed generally adjacent said second bonding and sealing surface;
- said first and second structural joint members generally forming said motor vehicle structural joint; and an expandable structural adhesive being disposed between said first and second structural joint members adjacent said respective first and second bonding and sealing surfaces, wherein said expandable structural adhesive being expandable to substantially fill an area between said first and second structural joint members, to substantially bond said first and second structural joint members to each other, and to substantially seal said first and second structural joint members from water and air intrusion without use of a separate sealant material, and wherein said expandable structural adhesive bonds said first and second structural joint members to provide a bending stiffness of greater than approximately 75,000 lbf/in and a torsional stiffness of greater than approximately 13,500 ft-lbf/deg for a coupe automobile, and a bending stiffness of greater than approximately 32,000 lbf/in and a torsional stiffness of greater than approximately 6,000 ft-lbf/deg for a convertible automobile.

11. A vehicle comprising a structural bonding and sealing system for a motor vehicle structural joint, said system comprising:

a first structural joint member including a first bonding and sealing surface;

a second structural joint member including a second bonding and sealing surface;

said first bonding and sealing surface being disposed generally adjacent said second bonding and sealing surface;

said first and second structural joint members generally forming said motor vehicle structural joint; and an expandable structural adhesive being disposed between said first and second structural joint members adjacent said respective first and second bonding and sealing surfaces, wherein said expandable structural adhesive being expandable to substantially fill an area between said first and second structural joint members, to substantially bond said first and second structural joint members to each other, and to substantially seal said first and second structural joint members from water and air intrusion without use of a separate sealant material, and wherein said expandable structural adhesive seals said first and second structural joint members to allow air leakage between said first and second structural joint members at less than approximately 200 cmf for coupe and convertible automobiles, and to further provide no water passage between said first and second structural joint members.

* * * * *